United States Patent [19]

Bowman et al.

[11] Patent Number: 4,888,315

[45] Date of Patent: Dec. 19, 1989

[54] HIGH SOLIDS BLENDED KAOLIN CLAY SLURRY

[75] Inventors: James A. Bowman, Jeffersonville; Ronald W. Andrews, Sandersville, both of Ga.

[73] Assignee: Georgia Kaolin Company, Inc., Union, N.J.

[21] Appl. No.: 870,606

[22] Filed: Jun. 4, 1986

[51] Int. Cl.$^4$ .............................................. C04B 33/04
[52] U.S. Cl. .................................... 501/144; 501/149; 106/486
[58] Field of Search .............................. 501/144, 149; 162/181.8

[56] References Cited

U.S. PATENT DOCUMENTS

| | | | |
|---|---|---|---|
| 2,907,666 | 10/1959 | Millman et al. | 501/149 |
| 3,085,894 | 4/1963 | Rowland | 106/306 |
| 3,393,082 | 7/1968 | Lyons et al. | 106/486 |
| 3,394,022 | 7/1968 | Lyons et al. | 106/486 |
| 4,154,899 | 5/1979 | Hershey et al. | 428/537 |
| 4,186,027 | 1/1980 | Bell et al. | 106/486 |
| 4,241,142 | 12/1980 | Kaliski et al. | 428/511 |

FOREIGN PATENT DOCUMENTS 206561  2/1984  German Democratic Rep. ............................. 162/181.8

*Primary Examiner*—William R. Dixon, Jr.
*Assistant Examiner*—Melissa Bonner
*Attorney, Agent, or Firm*—William W. Habelt

[57] ABSTRACT

A high solids kaolin clay slurry having unexpectedly improved high shear viscosity is prepared by blending a chemically dispersed fine particle size Tertiary kaolin with a coarser particle size Cretaceous kaolin to provide a resultant blend having a controlled particle size range and particle size distribution.

2 Claims, No Drawings

HIGH SOLIDS BLENDED KAOLIN CLAY SLURRY

BACKGROUND OF THE INVENTION

The present invention relates to an improved kaolin clay product useful in the paper industry and, more particularly, to a blended kaolin clay slurry shippable at a high solids content and having a better high shear viscosity than a neat slurry at similar solids content of either of the individual kaolin clays making up the blend.

Large amounts of refined kaolin clay are used in the paper industry, at times in combination with calcium carbonate as a coating for paper to produce a high quality surface for printing. Although the qualities of brightness, gloss and opacity are of prime importance in clay slurries produced for use as paper coatings, the clay slurries must also have acceptable rheological properties so that they may be readily blended with calcium carbonate and other materials, such as starch and/or latex binders, to form the ultimate paper coating. Heretofore, it has been customary to ship kaolin clay slurries for use in paper coating at solids levels in the range of about 69.5% to 70.5%.

In conventional practice within the paper industry, slurried calcium carbonate is blended with the 69.5% to 70.5% solids slurried kaolin together with starch and/or latex binders to form a paper coating which is spread over the paper to improve the print gloss of the paper and provide a high quality surface for printing. In the process of blending these materials, the solids content of the resultant coating is typically reduced to a level in the range of 55% to 65% solids, which is lower than the desired level of solids that some segments of the paper industry would prefer to see in paper coating of 65% to 72% by weight.

In order to raise the solids level in the resultant paper coating to the desired level within the industry, dry kaolin clay must be added to the paper coating mixture. Typically, the dry kaolin is either added to the mixture from bags through a very labor intensive hand operation or through elaborate and capital intensive bulk solids handling systems. Of course, the amount of dry kaolin particulate solids which can be added to the paper coating may be limited in any given instance by resulting increases in the viscosity of the paper coating above acceptable limits and the high energy costs associated with the high shear mixing required to thoroughly distribute the dry solids throughout the paper coating.

Accordingly, it would be desirable to provide to the papermaking industry a slurried kaolin product having a solids preferred level in the range of 72% to 76%, i.e. a solids level approximately equivalent to that of the slurried calcium carbonate typically mixed with the slurried kaolin to form the paper coating, so that upon addition of the low solids latex. and starch binders, the resultant paper coating will have a solids content in the preferred range of 65% to 72% solids without the labor, energy and capital investment cost associated with adding dry kaolin to the paper coating blend. However, prior attempts to produce a slurried kaolin product at a solids content on the order of 75% have been limited as the viscosity of kaolin slurries resulting from these prior art attempts have resulted in unacceptably poor low and high shear viscosities at solids levels above 70%.

Accordingly, it is an object of the present invention to provide a slurried kaolin clay product having a solids content of at least 72% by weight while having rheological properties acceptable for use of the product as a paper coating.

SUMMARY OF THE INVENTION

In accordance with the present invention, there is provided a slurried kaolin clay product having rheological properties suitable for use in manufacturing paper coating which consists of a blend in an aqueous suspension of particles of a Tertiary kaolin of which at least 98% are of a particle size less than 2 microns, and particles of a Cretaceous kaolin of which at least 60% are of a particle size less than 2 microns, the Tertiary kaolin particles and the Cretaceous kaolin particles comprising in combination at least 72% by weight of the blend. The aqueous suspension in which the blend of the Tertiary kaolin particles and the Cretaceous kaolin particles is formed and dispersed with a solution of a water-soluble dispersing agent, perferably sodium hexametaphosphate, in water at a level of 3 to 6 pounds of sodium hexametaphosphate per ton of dry kaolin clay.

Further in accordance with the present invention, the resulting blend of Tertiary kaolin particles and Cretaceous kaolin particles consist of kaolin particles of which about 94% to 96% by weight of particles have a particle size less than 2.0 microns, about 88% to 92% by weight of particles have a particle size less than 1.4 microns, about 76% to 80% by weight of particles have a particle size less than 0.8 microns, and about 24% to 26% by weight of particles have a particle size less than 0.2 microns.

It has been found that a slurried kaolin product consisting of a blend of Tertiary kaolin particles and Cretaceous kaolin particles as provided in the present invention has a better high shear viscosity at high solids level than a neat slurry of either the Tertiary kaolin clay alone or the Cretaceous kaolin clay alone.

DESCRIPTION OF A PREFERRED EMBODIMENT

Applicants have discovered that a high solids kaolin clay slurry can be prepared having unexpectedly improved low and high shear viscosity by blending a properly chemically dispersed fine particle size Tertiary kaolin with a coarser particle size Cretaceous kaolin to provide a resultant blend having a controlled particle size range and particle size distribution. The resultant kaolin product exhibits a high shear viscosity at a solids level at or above 72% by weight that is lower than the corresponding high shear viscosities for neat slurries of either of the constituent kaolin clays at such high solids levels.

The term Tertiary kaolin, as used herein, is defined in Grimm's "Applied Clay Mineralogy", McGraw-Hill Company Book Company, Inc. (1962), as "hard" kaolin which was deposited as a sediment during the Tertiary geological period or age. The term Cretaceous kaolin, as used herein, is defined in the aforementioned Grimm publication as referring to kaolin clay which was deposited as a sediment during the Cretaceous geological period or age. A discussion of Cretaceous and Tertiary kaolins is provided in the Grimm publication, in particular at pages 394–398 wherein a comparison is made between Cretaceous and Tertiary kaolins. Pages 394–398 of the aforementioned Grimm publication are hereby incorporated by reference as a means of characterizing kaolin clays as Tertiary kaolins or Cretaceous kaolins for use in the practice of the present invention. Further, the terms No. 1 coating grade kaolin, No. 2 coating grade kaolin, and No. 3 coating grade kaolin are used herein in accordance with the custom within the industry to refer respectively to Cretaceous kaolin clay which has been centrifugally classified to 90% to 92% by weight less than 2 microns, which has been centrifugally classified to a particle size of 80% to 82% by weight less than 2 microns, and which has been centrifugally classified to a particle size of 70% to 80% less than 2 microns.

The uniqueness of the slurried clay product of the present invention and its superior high shear rheological properties will be better appreciated with reference to the following examples, which are to be regarded as illustrative, not limiting, of the invention. In each of the examples, the slurried kaolin clay product was formed by adding particles of the finer Tertiary kaolin clay into an aqueous slurry of the coarser particle size Cretaceous kaolin clay with the solids level of the blend being maintained in the range of 74% to 76% solids by weight. Addition of the fine particle size Tertiary kaolin continued until the high shear viscosity of the blend as measured using a Hercules Viscometer in accordance with standard industry procedures, reached and passed a minimum value which thereby characterized the unique synergistic blend of fine particle size Tertiary kaolin and coarse particle size Cretaceous kaolin in each instance.

Further, the aqueous suspension in which the Cretaceous kaolin and Tertiary kaolin were blended in each of the examples is dispersed with an aqueous solution of a water soluble dispersing agent in water. The water soluble dispersing agent utilized in each of the examples was sodium hexametaphosphate as it appeared to perform slightly superior to other conventional dispersing agents in facilitating the formation of a high solids clay slurry. However, it is contemplated that other well known conventional kaolin dispersing agents, including sodium polyacrylate and other condensed phosphates such as sodium tripolyphosphate, tetrasodium polyphosphate, and sodium acid polyphosphate, may be utilized in forming clay slurries in accordance with the present invention.

EXAMPLE 1

A No. 1 coating grade Cretaceous kaolin, produced by the Georgia Kaolin Company and marketed under the name KCS, was incrementally blended with a fine particulate size Tertiary kaolin, produced by the Georgia Kaolin Company and marketed under the name ASTRAGLAZE, in an aqueous suspension containing sodium hexametaphosphate as a dispersing agent to form a plurality of aqueous clay suspensions at 75% solids by weight. The aqueous clay suspensions produced comprised kaolin clay slurries consisting from 100% Cretaceous kaolin and 0% Tertiary kaolin at 10% interval to 0% Cretaceous kaolin and 100% Tertiary kaolin. The level of dispersing agent used in forming each of these slurries was maintained at 0.2% by weight above the optimum dispersion level as determined by the minimum low shear viscosity measurement. Low shear viscosity measurements were based on the Brookfield viscosity measured at 10 RPM in accordance with the standard practice within the industry and reported in units of centipoises. Additionally, high shear viscosity measurements were made on each of the slurries using a Hercules Viscometer to measure the Hercules viscosity at 1100 RPM and at 4400 RPM in accordance with standard measurement techniques utilized within the industry with the resultant viscosity being reported in units of RPM.

TABLE I

| Percent KCS | 100 | 90 | 80 | 70 | 60 | 50 | 40 | 30 | 20 | 10 | 0 |
|---|---|---|---|---|---|---|---|---|---|---|---|
| Percent ASTRAGLAZE | 0 | 10 | 20 | 30 | 40 | 50 | 60 | 70 | 80 | 90 | 100 |
| 10 rpm Brookfield, Centipoise | 2150 | 2450 | 4000 | 2060 | 2040 | 2120 | 2650 | 2920 | 3540 | 3650 | 5600 |
| 1100[1] rpm Hercules, RPM | 190 | 250 | 335 | 460 | 655 | 680 | 725 | 580 | 500 | 390 | 225 |
| 4400[2] rpm Hercules, RPM | 450 | 450 | 625 | 600 | 800 | 740 | 750 | 575 | 505 | 400 | 660 |

As seen in Table I, the best high shear viscosity at 1100 rpm was obtained with a blend of 60% fine Tertiary kaolin and 40% No. 2 coating grade kaolin. However, at 4400 RPM, the best high shear viscosity with a blend of 40% fine Tertiary kaolin and 60% of No. 2 coating grade kaolin. Thus, at a solids level of 75%, as the shear was increased, i.e. the RPM of the Hercules viscometer, the optimum Hercules viscosity was obtained with a reduced amount of fine kaolin particles present. This is contrary to the conventional wisdom in the industry which believes that viscosity would increase with a reduction in the amount of fine kaolin particles within the slurry. It is believed that the optimization of viscosity with a reduction in fine particles as experienced in Example 1 is due to the achievement of optimum particle packing being obtained with a particular unique mixture of coarse and fine kaolins. Additionally, it can be readily seen in Table I that the optimum high shear viscosity was obtained using a blend of the coarse and fine kaolins in accordance with the present invention and that the viscosity of the blended kaolin slurry was significantly below that of either a neat solution of the coarse Cretaceous kaolin or a neat solution of the fine Tertiary kaolin.

EXAMPLE 2

A Cretaceous kaolin clay mined in Washington County, Ga., was centrifuged to prepare a No. 1 coating grade kaolin having a particle size of 92% by weight less than 2 microns and 78% by weight greater than 0.2 microns, and a Tertiary kaolin clay mined in McDuffie County, Georgia, was centrifuged to provide a fine particle size kaolin clay having a particle size of 98% less than 2 microns. These two kaolins were then blunged with water containing sodium hexametaphosphate dispersing agent to form a plurality of 74% solids slurries ranging at 20% intervals from a slurry comprising 100% by weight of the Cretaceous kaolin to a slurry comprising 100% by weight of the Tertiary kaolin. The high shear viscosity of each of the resultant slurries is then measured using a Hercules viscometer in accordance with standard accepted practice within the industry and the results reported in units of either RPM or dyne as appropriate.

TABLE II

| Sample I.D. | 74% Solids High Shear Viscosity | Percent Less Than | | | |
|---|---|---|---|---|---|
| | | 2 um | 1.4 um | 0.8 um | 0.2 um |
| 100% No. 1 Coating Clay | 685 RPM | 92% | 87% | 71% | 22% |
| 100% Fine Clay | 790 RPM | 98% | 97% | 88% | 29% |
| 20% No. 1 Coating Clay, 80% Fine Clay | 1045 RPM | 96% | 93% | 84% | 25% |
| 40% No. 1 Coating Clay, 60% Fine Clay | 4.0 dynes | 95% | 91% | 78% | 25% |
| 60% No. 1 Coating Clay, 40% Fine Clay | 7.2 dynes | 95% | 89% | 76% | 25% |
| 80% No. 1 Coating Clay, 20% Fine Clay | 1020 RPM | 94% | 87% | 73% | 22% |

As can be seen in Table II, the optimum high shear viscosity was obtained with a blend of 40% of the coarser Cretaceous kaolin and 60% of the finer Tertiary kaolin. Also shown in Table II is the particle size distribution which was measured for each of the slurries formed in Example 2. As can be seen, the particle size for the optimum viscosity slurry was intermediate the particle size of either a neat slurry of the finer Tertiary kaolin or a neat slurry of the coarser Cretaceous kaolin. Again, it is believed that the obtaining of an optimum viscosity with the blended kaolin slurry was due to the optimum particle size packing obtained with the particulate particle size distribution resulting from the blending of the coarser Cretaceous kaolin and the finer Tertiary kaolin in accordance with the present invention.

The viscosity measurements reported in Table II also illustrate that the high shear viscosity of a neat slurry of either the finer Tertiary kaolin or the coarser Cretaceous kaolin may be improved by adding some of the other type thereto. The high shear viscosity of the coarser No. I coating clay was improved from 685 RPM for a neat 74% solids slurry thereof to 1020 RPM by adding finer Tertiary kaolin clay thereto to give a 74% solids slurry comprising 80% of the coarser No. 1 coating clay and 20% of the finer Tertiary kaolin. Similarly, the high shear viscosity of the finer Tertiary kaolin was improved from 790 RPM for a neat 74% solids slurry thereof to 1045 RPM by adding the coarser No. I coating Cretaceous clay thereto to give a 74% solids slurry comprising 80% of the finer Tertiary slurry comprising 80% of the finer Tertiary kaolin and 20% of the coarser No. I coating clay. Again contrary to conventional wisdom, Applicants have found that a blend of finer Tertiary kaolin and coarser Cretaceous kaolin will exhibit better high shear rheological properties than a neat slurry of the finer Tertiary kaolin.

EXAMPLE 3

A Cretaceous kaolin mined in Washington County, Ga., was centrifuged to produce a No. 2 coating grade kaolin having a particle size of 84% by weight less than 2 microns and 81% by weight greater than 0.2 microns, and a Tertiary kaolin mined in McDuffie County, Ga., was centrifuged to prepare a fine particle size kaolin having a particle size of 98% by weight less than 2 microns. These kaolins were then blunged with water containing sodium hexametaphosphate dispersing agent to form 74% by weight solid slurries ranging at 20% incremental levels from 100% of the coarser Cretaceous kaolin to 100% of the finer Tertiary kaolin. High shear Hercules viscosity measurements were taken on each of the resultant slurries with the Hercules viscosities resulting therefrom reported in RPM or dynes as appropriate as shown in Table III.

TABLE III

| Sample I.D. | 74% Solids High Shear Viscosity | Percent Less Than | | | |
|---|---|---|---|---|---|
| | | 2 um | 1.4 um | 0.8 um | 0.2 um |
| 100% No. 2 Coating Clay | 690 RPM | 84% | 77% | 63% | 19% |
| 100% Fine Clay | 790 RPM | 98% | 97% | 88% | 29% |
| 20% No. 2 Coating Clay, 80% Fine Clay | 3.8 dynes | 94% | 89% | 79% | 26% |
| 40% No. 2 Coating Clay, 60% Fine Clay | 3.7 dynes | 94% | 89% | 77% | 25% |
| 60% No. 21 Coating Clay, 40% Fine Clay | 5.8 dynes | 89% | 83% | 72% | 23% |
| 80% No. 2 Coating Clay, 20% Fine Clay | 12.5 dynes | 88% | 81% | 68% | 22% |

As can be seen in Table III, the optimum high shear viscosity was obtained with a slurry containing from 60% to 80% of the finer Tertiary kaolin blended with 40% to 20% of the coarser Cretaceous kaolin. As obtained in Example 2, the optimum high shear viscosity was associated with a particular particle size distribution which was intermediate the particle size distribution of a neat slurry of the finer Tertiary kaolin and a neat slurry of the coarser Cretaceous kaolin. The optimum blend in each instance was characterized by a particle size distribution in which 94% to 96% by weight of the kaolin particles have a particle size of less than 2.0 microns, about 88% to 92% by weight of the kaolin particles have a particle size of less than 1.4 microns, about 76% to 80% by weight of the kaolin particles have a particle size less than 0.8 microns, and about 24% to 26% by weight of the kaolin particles have a particle size less than 0.2 microns. In both Examples 1 and 2, blending a coarser Cretaceous kaolin in which at least 75% of the particles are greater than 0.2 microns with the finer Tertiary kaolin produced a resultant clay slurry having improved rheological properties.

EXAMPLE 4

Neat slurries of a No. 1 coating grade kaolin, a No. 2 coating grade kaolin, and a fine particle size kaolin clay were prepared as in Examples 2 and 3 at 75% solids by weight with the amount of sodium hexametaphosphate dispersing agent utilized to form each slurry increased incrementally from 0 to 0.15 to 0.20% by weight of sodium hexametaphosphate in water. The low shear Brookfield viscosity and the high shear Hercules viscosity were measured using standard procedures within the industry for each of the slurries at each of the various incremental dosages of sodium hexametaphosphate with the results being reported in Table IV in centipoise for the low shear viscosity and the RPM or dynes as appropriate for the high shear viscosity.

TABLE IV

| | Percent SHMP* | Low Shear Viscosity | High Shear Viscosity |
|---|---|---|---|
| 100% No. 1 Coating Clay | 0 | 770 cpe | 380 RPM @ 18 dynes |
| | .05 | 650 cpe | 500 RPM @ 18 dynes |
| | .10 | 650 cpe | 585 RPM @ 18 dynes |
| | .15 | 860 cpe | 650 RPM @ 18 dynes |
| | .20 | 1100 cpe | 685 RPM @ 18 dynes |

TABLE IV-continued

|  | Percent SHMP* | Low Shear Viscosity | High Shear Viscosity |
|---|---|---|---|
| 100% No. 2 Coating Clay | 0 | 575 cpe | 485 RPM @ 18 dynes |
|  | .05 | 600 cpe | 585 RPM @ 18 dynes |
|  | .10 | 700 cpe | 640 RPM @ 18 dynes |
|  | .15 | 940 cpe | 690 RPM @ 18 dynes |
| 100% Fine Particle Clay | 0 | 1040 cpe | 580 RPM @ 18 dynes |
|  | .05 | 950 cpe | 625 RPM @ 18 dynes |
|  | .10 | 1040 cpe | 790 RPM @ 18 dynes |
|  | .15 | 1220 cpe | 785 RPM @ 18 dynes |
| 40% No. 1 Clay/60% Fine Clay | 0 | 800 cpe | 905 RPM @ 18 dynes |
|  | .05 | 800 cpe | 1045 RPM @ 18 dynes |
|  | .10 | 900 cpe | 5.1 dynes @ 1100 RPM |
|  | .15 | 1100 cpe | 4.0 dynes @ 1100 RPM |
| 40% No. 2 Clay/60% Fine Clay | 0 | 690 cpe | 4.4 dynes @ 1100 RPM |
|  | .05 | 705 cpe | 3.9 dynes @ 1100 RPM |
|  | .10 | 850 cpe | 3.7 dynes @ 1100 RPM |
|  | .15 | 1060 cpe | 3.5 dynes @ 1100 RPM |

As seen in Table IV, the optimum high shear viscosity for each of the clay slurries at 75% solids was obtained with a sodium hetamexaphosphate dosage greater than the dosage level of sodium hexametaphosphate utilized in forming the slurry with the optimum low shear viscosity. In each case, the dosage level of sodium hexametaphosphate resulting in the best high shear viscosity was at least 2 to 3 times greater than the amount of sodium hexametaphosphate required to optimize low shear viscosity for 75% solids kaolin slurry.

EXAMPLE 5

An optimumly blended kaolin clay slurry at 75% solids containing 85% of coarse No. 2 coating grade Cretaceous kaolin and 15% fine Tertiary kaolin was dispersed with sodium hexametaphosphate at treatment levels ranging from 0 pounds sodium hexametaphosphate per ton of dry kaolin to 6 pounds of sodium hexametaphosphate per ton of dry kaolin at increments of 1 pound of sodium hexametaphosphate per ton of dry kaolin to form a plurality of dispersed, blended kaolin clay slurries. The low shear Brookfield viscosity was measured on each of the resultant slurries at 10, 20 and 100 RPM in addition to measuring the high shear Hercules viscosity with the results presented in Table V.

TABLE V

|  |  | Brookfield, cpe | | | |
|---|---|---|---|---|---|
| % SHMP | #T SHMP | 10 RPM | 20 RPM | 100 RPM | Hercules Viscosity |
| 0 | 0 | 950 | 625 | 285 | 525 RPM |
| 0.05 | 1 | 960 | 690 | 273 | 560 RPM |
| 0.10 | 2 | 1230 | 790 | 304 | 720 RPM |
| 0.15 | 3 | 1490 | 980 | 364 | 740 RPM |
| 0.20 | 4 | 2100 | 1290 | 446 | 770 RPM |
| 0.25 | 5 | 2650 | 1610 | 530 | 770 RPM |
| 0.30 | 6 | 3300 | 1970 | 634 | 740 RPM |

As seen in Table V, an optimum dosage level of dispersing agent was achieved in the range of 3 to 6 pounds of sodium hexametaphosphate per ton of dry clay with the best high shear Hercules viscosity being obtained between 4 to 5 pounds of sodium hexametaphosphate per ton of clay.

EXAMPLE 6

In this example, a neat slurry of fine particle size Tertiary kaolin, having a particle size of 98% less than 2 microns was centrifuged to remove a portion of the fines to determine what effect the removal of fines would have on high shear viscosity at both 70% solids and at 74.5% solids. In addition to the control slurry wherein no defining occurred, two additional slurries were tested, one having 11.8% of the fines removed and the other have 25% of the fines removed. Hercules viscosity measurements were taken using a Hercules viscometer with the results being presented in Table 6.

TABLE VI

|  | Hercules Viscosity | |
|---|---|---|
|  | 70% Solids | 74.5% Solids |
| Control, No Defining | 1.1 dynes | 450 RPM |
| Centrifuge, 11.8% Defining | 1.2 dynes | 170 RPM |
| Centrifuge, 25.0% Defining | 1.2 dynes | 100 RPM |

As seen in Table VI, the removal of fines had little effect on viscosity at 70% solids. However, at 74.5% solids, the removal of fines resulted in a significant increase in viscosity over the viscosity of the control sample. As noted hereinbefore, the particle size distribution characteristic of the blended kaolin slurries of the present invention having optimum high shear viscosity was coarser than the particle size distribution associated with the fine particle Tertiary kaolin slurry. Accordingly, one could have expected the removal of fines from the fine particle Tertiary kaolin slurry as done in Example 6 to have resulted in a particle size distribution akin to that of the blended clay slurries of the present invention and therefore result in an improvement in viscosity over that of the fine particle size Tertiary kaolin slurry without fines being removed. However, as the results of Example 6 show, the exact opposite trend was obtained. This indicates that particle size distribution alone is not the controlling factor in optimizing high shear viscosity. Rather, it is evident that the blending of coarser Cretaceous kaolins and finer Tertiary kaolins in accordance with the present invention yields a unique particle size packing which results in an optimum high shear viscosity that is unattainable simply by adjusting the particle size distribution of the ultra fine particle size Tertiary kaolin to provide a somewhat coarser Tertiary kaolin.

As the Examples hereinbefore presented illustrate, a kaolin clay slurry product can be formed in accordance with the present invention at a high solids content of at least 72% by weight, and particularly in the range of 74% to 76% by weight, by blending particles of a fine Tertiary kaolin of which 98% are of a particle size less than 2 microns and particles of a coarser Cretaceous kaolin in an aqueous suspension containing a water-soluble dispersing agent to form a slurry product which exhibits a better high shear viscosity than exhibited by neat unblended slurries of these kaolins at the same high solids content. It is believed that when a kaolin clay slurry is formed in accordance with the present invention, a unique particle size distribution unexhibited by the unblended Tertiary kaolin and Cretaceous kaolin clays is achieved which results in optimum particle packing at the high solids level thereby resulting in improved high shear viscosity which results in improved pumpability and runability of paper coatings produced utilizing the high solids slurried kaolin clay product of the present invention. The unique synergistic effect on high shear viscosity resulting from the blending of the finer Tertiary kaolin clay particles with the coarser Cretaceous kaolin clay particles in accordance with the present has not been heretofore appreciated. Applicants have found that the generally accepted belief that high shear viscosities decrease in proportion to an increase in the quantity of fines present in a clay slurry is not true at least in the high solids range as illustrated in the Examples presented hereinbefore.

We claim:

1. A kaolin product consisting of a blend in aqueous suspension of particles of a fractionated Tertiary kaolin of which at least 98% are of a particle size less than 2 microns and particles of a fractionated Cretaceous kaolin of which at least 60% are of a particle size less than 2 microns in an aqueous suspension, said Tertiary kaolin particles comprising at least 50% of the kaolin particles in said blend and said Tertiary kaolin particles and said Cretaceous kaolin particles comprising in combination at least 72% by weight of said aqueous blend, the resulting blend of said particles of fractionated Tertiary kaolin and said particles of fractionated Cretaceous kaolin consists of kaolin particles of which about 94% to 96% by weight of particles have a particle size of less than 2.0 microns, about 88% to 92% by weight of particles have a particle size of less than 1.4 microns, about 75% to 80% by weight of particles have a particle size less than 0.8 microns, and about 24% to 26% by weight of particles have a particles size of less than 0.2 microns.

2. A kaolin product consisting of a bland in aqueous suspension of particles of a fractionated Tertiary kaolin of which at least 98% are of a particle size less than 2 microns and particles of a fractionated Cretaceous kaolin of which at least 60% are of a particle size less than 2 microns, said Tertiary kaolin particles comprising about 60% to about 80% of the kaolin particles in said blend and said Tertiary kaolin particles and said Cretaceous kaolin particles comprising in combination at least 72% by weight of said aqueous blend, said blend of kaolin particles having a particle size distribution which lies intermediate the respective particles size distributions of the finer Tertiary kaolin and the coarser Cretaceous kaolin.

* * * * *